US012678724B2

(12) United States Patent (10) Patent No.: US 12,678,724 B2
Tashiro et al. (45) Date of Patent: Jul. 14, 2026

(54) FILTER MATERIAL FOR AIR FILTER AND METHOD FOR PRODUCING FILTER MATERIAL

(71) Applicant: HOKUETSU CORPORATION, Nagaoka (JP)

(72) Inventors: Nozomi Tashiro, Nagaoka (JP); Masashi Sato, Nagaoka (JP)

(73) Assignee: HOKUETSU CORPORATION, Nagaoka (JP)

( * ) Notice: Subject to any disclaimer, the term of this patent is extended or adjusted under 35 U.S.C. 154(b) by 302 days.

(21) Appl. No.: 18/698,292

(22) PCT Filed: Oct. 4, 2021

(86) PCT No.: PCT/JP2021/036709
§ 371 (c)(1),
(2) Date: Apr. 3, 2024

(87) PCT Pub. No.: WO2023/058102
PCT Pub. Date: Apr. 13, 2023

(65) Prior Publication Data
US 2024/0408523 A1 Dec. 12, 2024

(51) Int. Cl.
| | |
|---|---|
| *B01D 39/20* | (2006.01) |
| *B01D 39/16* | (2006.01) |
| *D04H 1/4218* | (2012.01) |
| *D04H 1/587* | (2012.01) |
| *D04H 1/645* | (2012.01) |
| *D06M 13/203* | (2006.01) |
| *D06M 13/395* | (2006.01) |
| *D06M 13/50* | (2006.01) |
| *D06M 13/53* | (2006.01) |
| *D06M 101/00* | (2006.01) |
| *D21H 13/40* | (2006.01) |
| *D21H 17/57* | (2006.01) |
| *D21H 21/16* | (2006.01) |
| *D21H 27/08* | (2006.01) |

(52) U.S. Cl.
CPC ....... *B01D 39/2024* (2013.01); *B01D 39/163* (2013.01); *D04H 1/4218* (2013.01); *D04H 1/587* (2013.01); *D04H 1/645* (2013.01); *D06M 13/203* (2013.01); *D06M 13/395* (2013.01); *D06M 13/50* (2013.01); *D06M 13/53* (2013.01); *D21H 13/40* (2013.01); *D21H 17/57* (2013.01); *D21H 21/16* (2013.01); *D21H 27/08* (2013.01); *B01D 2239/0464* (2013.01); *B01D 2239/0618* (2013.01); *B01D 2239/086* (2013.01); *B01D 2239/10* (2013.01); *B01D 2239/1258* (2013.01); *B01D 2239/1291* (2013.01); *D06M 2101/00* (2013.01); *D06M 2200/12* (2013.01); *D10B 2401/021* (2013.01); *D10B 2401/063* (2013.01); *D10B 2505/04* (2013.01)

(58) Field of Classification Search
CPC .............. B01D 39/163; B01D 39/2017; B01D 39/2024; B01D 2239/04; B01D 2239/0428; B01D 2239/0464; B01D 2239/0618; B01D 2239/086; B01D 2239/10; B01D 2239/1258; B01D 2239/1291; D04H 1/4218; D04H 1/587; D04H 1/645; D06M 13/203; D06M 13/395; D06M 13/50; D06M 13/53; D06M 2101/00; D06M 2101/02; D06M 2200/12; D21H 13/40; D21H 17/57; D21H 21/16; D21H 27/08; D10B 2401/021; D10B 2401/063; D10B 2505/04
See application file for complete search history.

(56) References Cited

FOREIGN PATENT DOCUMENTS

| | | | |
|---|---|---|---|
| EP | 1 291 063 A1 | 3/2003 | |
| EP | 1 314 468 A1 | 5/2003 | |
| EP | 3 460 021 A1 | 3/2019 | |
| EP | 3460021 B1 * | 6/2023 | .......... D06M 15/652 |
| JP | H2-175997 A | 7/1990 | |
| JP | 9-225226 A | 9/1997 | |
| JP | 2001-162122 A | 6/2001 | |
| JP | 2004-154672 A | 6/2004 | |
| JP | 2007-29916 A | 2/2007 | |
| JP | 2010-94580 A | 4/2010 | |
| JP | 2011-240311 A | 12/2011 | |
| JP | 2017-60932 A | 3/2017 | |
| JP | 2017-222827 A | 12/2017 | |
| KR | 20120022790 A * | 3/2012 | ............. D21H 13/10 |
| WO | 97/04851 A1 | 2/1997 | |
| WO | 02/16005 A1 | 2/2002 | |
| WO | 2017/199726 A1 | 11/2017 | |
| WO | WO-2020175376 A1 * | 9/2020 | .......... D06M 15/564 |

OTHER PUBLICATIONS

Machine translation of EP-3460021-B1 (Year: 2023).*
Machine translation of KR-20120022790-A (Year: 2012).*
Machine translation of WO-2020175376-A1 (Year: 2020).*
International Search Report dated Dec. 7, 2021 from corresponding International Patent Application No. PCT/JP2021/036709, 4 pages.
Written Opinion dated Dec. 7, 2021 from corresponding International Patent Application No. PCT/JP2021/036709, 3 pages.

* cited by examiner

*Primary Examiner* — Robert Clemente
(74) *Attorney, Agent, or Firm* — Ruggiero McAllister & McMahon LLC

(57) ABSTRACT

A filter medium for an air filter is composed of a wet-laid nonwoven fabric. The filter medium contains a binder resin and a water repellent. The water repellent contains, as a main component, a hydrocarbon-based polymer free of fluorine and silicon in a molecule thereof. The binder resin and the water repellent are crosslinked by an isocyanate crosslinking component.

12 Claims, No Drawings

FILTER MATERIAL FOR AIR FILTER AND METHOD FOR PRODUCING FILTER MATERIAL

CROSS-REFERENCE TO RELATED APPLICATIONS

The present application is a 35 U.S.C. § 371 National Stage patent application of International patent application PCT/JP2021/036709, filed on Oct. 4, 2021, the entire disclosure of which is incorporated by reference herein.

BACKGROUND OF THE DISCLOSURE

1. Field of the Disclosure

The present disclosure relates to a filter medium for an air filter used for an air filter installed in a clean room for a semiconductor, a liquid crystal, and food industry, a building air conditioner, an air purifier, and the like.

2. Description of Related Art

In order to collect and remove particles of submicron or micron order in the air, an air filter including a filter medium for an air filter is generally used. The air filter is classified into a coarse dust filter, a medium performance filter, a HEPA filter, an ULPA filter, and others in proportion to the size of particles that can be collected and the collection efficiency thereof. The latter filters can collect particles having a smaller particle size and have higher collection efficiency.

The filter medium for an air filter requires having necessary particle collection efficiency and having a low pressure loss so as not to increase blowing energy. As an index value of the collection efficiency and the pressure loss, there is a PF value shown in Mathematical Formula 1, and the higher this value is, the higher the collection efficiency is and the lower the pressure loss is, which indicates that the filter medium is excellent.

Mathematical Formula 1:

$$PF \text{ value} = \frac{\log_{10}(\text{Permeability}[\%]/100)}{\text{Pressure loss}[\%]/9.81} \times (-100)$$

Here, permeability [%]=100−collection efficiency [%]

Further, the filter medium for an air filter requires having sufficient strength so that cracking or rupture does not occur in processing and during ventilation use.

Further, as a physical property required for the filter medium for an air filter, there is water repellency. Sufficient water repellency can prevent the occurrence of a problem of water droplets blocking pores of the filter medium when dew condensation due to a change in air temperature occurs or air with high humidity flows therethrough. In addition, in a place close to the sea, it can prevent a deliquescence phenomenon, in which sea salt particles collected by the filter medium are liquefied by moisture in the air and flow out. Meanwhile, when water repellency is low, there is a problem that a sealant, a hot melt or the like, used in processing the filter medium into an air filter unit, permeates.

In order to impart water repellency to a filter medium, a method of adhering a fluorine-based water repellent and/or a silicone-based water repellent (see, for example, PTL 1 or PTL 2) is widely used.

Examples of the filter medium using a water repellent other than fluorine-based and silicone-based water repellents include a method using synthetic paraffin (see, for example, PTL 3) and a method using an alkyl ketene dimer (see, for example, PTL 4).

CITATION LIST—PATENT LITERATURE

PTL 1: JP H2-175997 A
PTL 2: JP H9-225226 A
PTL 3: WO 97/04851 A
PTL 4: WO 02/016005 A
PTL 5: JP 2017-222827 A
PTL 6: WO 2017/199726 A

SUMMARY OF THE DISCLOSURE

However, in the technique disclosed in PTL 1 or PTL 2, since a perfluoroalkyl compound (hereinafter abbreviated as PFAS) contained in the fluorine-based water repellent is hardly decomposed and has high bioaccumulation, there is a movement to regulate the use thereof worldwide. In addition, a siloxane compound and a cyclic siloxane, which is a condensate thereof, contained in the silicone-based water repellent have a problem of adhering to the surface of a semiconductor substrate or a glass substrate to cause a decrease in product yield or occurrence of cissing. Further, there is a movement to regulate the use of a cyclic siloxane because it is hardly decomposed and has high bioaccumulation like a PFAS.

In addition, in the technique disclosed in PTL 3 or PTL 4, it has been difficult to achieve a physical property balance among the PF value, the strength, and the water repellency of the filter medium in both methods.

As described above, a filter medium for an air filter which does not contain a PFAS nor a siloxane compound is required, but in the conventional technique, it has been difficult to obtain a filter medium having a good physical property balance among the PF value, the water repellency, and the strength. Therefore, an object of the present disclosure is to provide a filter medium for an air filter which does not contain a PFAS nor a siloxane compound and has a good physical property balance among the PF value, the water repellency, and the strength.

The present inventors have intensively conducted studies for achieving the above-mentioned object, and resultantly found that the above-mentioned object can be achieved by crosslinking a binder resin and a water repellent containing, as a main component, a hydrocarbon-based polymer free of fluorine and silicon in a molecule thereof by an isocyanate crosslinking component, and completed the present invention. That is, the filter medium for an air filter according to the present invention is a filter medium for an air filter composed of a wet-laid nonwoven fabric, wherein the filter medium for an air filter contains a binder resin and a water repellent, the water repellent contains, as a main component, a hydrocarbon-based polymer free of fluorine and silicon in a molecule thereof, and the binder resin and the water repellent are crosslinked by an isocyanate crosslinking component.

In the filter medium for air filter according to the present invention, the hydrocarbon-based polymer is preferably an acrylic polymer. According to such a structure, a filter medium for an air filter having higher water repellency can be obtained.

In the filter medium for an air filter according to the present invention, the wet-laid nonwoven fabric preferably contains a glass fiber. According to such a structure, a filter medium for an air filter having a higher PF value can be obtained.

In the filter medium for an air filter according to the present invention, the binder resin is preferably an acrylic binder resin.

In the filter medium for an air filter according to the present invention, the water repellent is preferably a cationic water repellent.

In the filter medium for an air filter according to the present invention, a solid mass ratio between the binder resin and the water repellent is preferably 10 to 50 parts by mass of the water repellent with respect to 100 parts by mass of the binder resin. With this ratio, a filter medium having a good physical property balance among the PF value, the water repellency, and the strength can be obtained.

In the filter medium for an air filter according to the present invention, a solid mass ratio of the water repellent to the isocyanate crosslinking component (water repellent/crosslinking agent) is preferably 95/5 to 60/40. With this ratio, particularly good water repellency can be obtained.

In the filter medium for an air filter according to the present invention, a total solid mass content of the binder resin, the water repellent, and the isocyanate crosslinking component in the filter medium is preferably 2 to 15% by mass with respect to the entire filter medium. With this ratio, a filter medium having a particularly good physical property balance between the PF value and the strength can be obtained.

In the filter medium for an air filter according to the present invention, a mass ratio between the binder resin and a sum of the water repellent and the isocyanate crosslinking component is preferably 11 to 70 parts by mass of the sum of the water repellent and the isocyanate crosslinking component with respect to 100 parts by mass of the binder resin. With this ratio, a filter medium having a particularly good physical property balance between the water repellency and the strength can be obtained.

A method for producing a filter medium for an air filter according to the present invention includes a step of forming a sheet in a wet state by forming a fiber slurry into the sheet by a wet papermaking method, a step of impregnating the sheet in a wet state with an aqueous dispersion containing a binder resin, a water repellent containing, as a main component, a hydrocarbon-based polymer free of fluorine and silicon in a molecule thereof, and an isocyanate crosslinking component, and a step of obtaining a dry sheet by heating and drying the sheet in a wet state impregnated with the aqueous dispersion, and by crosslinking the binder resin and the water repellent by the isocyanate crosslinking component. According to this production method, it is practical to obtain a filter medium for an air filter which does not contain a PFAS nor a siloxane compound and has a good physical property balance among the PF value, the water repellency, and the strength.

In the method for producing a filter medium for an air filter according to the present invention, the hydrocarbon-based polymer is preferably an acrylic polymer. According to such a production method, a filter medium for an air filter having higher water repellency can be obtained.

In the method for producing a filter medium for an air filter according to the present invention, the fiber slurry preferably contains a glass fiber. According to such a production method, a filter medium for an air filter having a higher PF value can be obtained.

According to this present disclosure, it is practical to obtain a filter medium for an air filter which does not contain a PFAS nor a siloxane compound and has a good physical property balance among the PF value, the water repellency, and the strength.

DETAILED DESCRIPTION OF THE DISCLOSURE

Next, the present invention will be described in detail with reference to embodiments, but the present invention is not construed as being limited to these descriptions. The embodiments may be variously modified as long as the effect of the present invention is exhibited.

The binder resin according to the present embodiment is used for adhering fibers of the nonwoven fabric to each other and imparting strength required for the filter medium for an air filter. The component of the binder resin is, for example, a polyacrylic acid ester resin, a polymethacrylic acid ester resin, a polystyrene resin, a polyvinyl acetate resin, a polyurethane resin, polyvinyl alcohol, or the like, and is selected from components having a functional group such as a hydroxy group, an amino group or a carboxy group, capable of reacting with an isocyanate crosslinking agent, in a molecule thereof. It is preferably an acrylic binder resin such as a polyacrylic acid ester resin or a polymethacrylic acid ester resin.

The water repellent according to the present embodiment is used for imparting water repellency required for the filter medium for an air filter by adhering to the fiber of the nonwoven fabric. The main component of the water repellent contains a hydrocarbon-based polymer free of fluorine and silicon in a molecule thereof. The water repellent contains a hydrocarbon-based polymer free of fluorine and silicon in a molecule thereof in an amount of 50% by mass or more, preferably 80% by mass or more, and more preferably 90% by mass or more. The hydrocarbon-based polymer is a polymer containing an organic compound that has a hydrocarbon as a skeleton and contains oxygen, nitrogen, and the like, and is selected from polymers having a functional group such as a hydroxy group, an amino group or a carboxy group, capable of reacting with an isocyanate crosslinking agent, in a molecule thereof. Among the hydrocarbon-based polymers, an acrylic polymer is more preferable. The acrylic polymer is a polymer obtained by polymerizing an acrylic acid ester or a methacrylic acid ester as a main raw material monomer. The acrylic polymer is synthesized with the raw material monomer incorporated in an amount of 50% by mass or more, preferably 80% by mass or more, and more preferably 90% by mass or more. Examples of such a hydrocarbon-based water repellent include Unidyne XF series (manufactured by Daikin Industries, Ltd.) made of an acrylic polymer, and MEISHIELD series (manufactured by Meisei Chemical Works, Ltd.) made of a hydrocarbon-based polymer, and the water repellent may be selected from these commercially available products.

The isocyanate crosslinking component according to the present embodiment is used for crosslinking the water repellents, the binder resin and the water repellent, or the binder resins to improve the water repellency. As the isocyanate crosslinking component, a commercially available isocyanate crosslinking agent may be used, and the component of the crosslinking agent is selected from an aliphatic isocyanate, an aromatic isocyanate, and the like having two or more isocyanate groups in a molecule thereof. The isocyanate group is preferably a blocked isocyanate to which a blocking group is added, and the component of the blocking group is selected from 3,5-dimethylpyrazole, methyl ethyl ketone oxime, ε-caprolactam, and the like. By using the isocyanate crosslinking agent, hydrophilic groups, for example, a hydroxy group, an amino group and a carboxy group, in the binder resin and the water repellent are used for crosslinking, and the bond between the binder resin and the water repellent is strengthened, so that water repellency is improved.

As the isocyanate crosslinking component according to the present embodiment, a water repellent containing an isocyanate crosslinking component may be used in addition to using the isocyanate crosslinking agent (see, for example, PTL 5 or PTL 6). It is preferably a water repellent which contains an isocyanate crosslinking component and does not contain fluorine nor silicon in a molecule thereof.

The water repellent is preferably a cationic water repellent. When the water repellent is cationic, water repellency is further improved. In particular, when the wet-laid nonwoven fabric contains a glass fiber, the fixability of the water repellent to the glass fiber is easily improved, so that the water repellent tends to remain in the filter medium. Therefore, the water repellency is easily improved.

When the binder resin and the water repellent are both an acrylic resin compound, the binder resin in the present embodiment is preferably an acrylic resin compound synthesized from an acrylic acid ester or a methacrylic acid ester, which is a raw material monomer of a polyacrylic acid ester, mainly containing a portion having 8 or less carbon atoms in the ester moiety (preferably 80% by mass or more, more preferably 90% by mass or more of the acrylic acid ester or the methacrylic acid ester). When the number of carbon atoms in the ester moiety is more than 8, it may be difficult to obtain adhesive strength.

Further, the water repellent in the present embodiment is preferably an acrylic resin compound synthesized from an acrylic acid ester or a methacrylic acid ester, which is a raw material monomer of a polyacrylic acid ester, mainly containing a portion having more than 8 carbon atoms in the ester moiety (preferably 80% by mass or more, more preferably 90% by mass or more of the acrylic acid ester or the methacrylic acid ester). Here, in the water repellent, the ester moiety is preferably a hydrocarbon group. This hydrocarbon group may be linear or branched, and may be a saturated hydrocarbon or an unsaturated hydrocarbon, and further may have an alicyclic or aromatic ring. Among them, a linear group is preferable, and a linear alkyl group is more preferable. The number of carbon atoms in the ester moiety is preferably 9 or more, and more preferably 12 or more. When the number of carbon atoms is 8 or less, sufficient water repellency as a water repellent treatment agent cannot be exhibited.

In the present embodiment, the solid mass ratio between the binder resin and the water repellent (binder resin/water repellent) is preferably 10 to 50 parts by mass of the water repellent with respect to 100 parts by mass of the binder resin. It is more preferably 15 to 45 parts by mass, and still more preferably 20 to 40 parts by mass. With this ratio, a filter medium having a good physical property balance among the PF value, the water repellency, and the strength can be obtained. When the mass ratio of the water repellent is less than 5 parts by mass, sufficient water repellency may not be obtained. Meanwhile, when the mass ratio of the water repellent is more than 50 parts by mass, the amount of the binder resin present is relatively small, and therefore, sufficient strength may not be obtained.

In the present embodiment, when an isocyanate crosslinking agent is used as the isocyanate crosslinking component, the solid mass ratio of the water repellent to the crosslinking agent (water repellent/crosslinking agent) is preferably 95/5 to 60/40. It is more preferably 80/20 to 70/30. When the mass ratio of the crosslinking agent is less than 95/5, crosslinking is insufficient, and sufficient water repellency may not be obtained. Meanwhile, when the mass ratio of the crosslinking agent is more than 60/40, the amount of the water repellent present is small, and sufficient water repellency may not be obtained.

In the present embodiment, the total solid mass content of the binder resin, the water repellent, and the isocyanate crosslinking component in the filter medium is preferably 2 to 15% by mass with respect to the entire filter medium. It is more preferably 4 to 10% by mass. When the total content of these components is less than 2% by mass, sufficient strength may not be obtained. Meanwhile, when the total content is more than 15% by mass, a sufficient PF value may not be obtained. The mass ratio between the binder resin and the sum of the water repellent and the crosslinking component is preferably 11 to 70 parts by mass, more preferably 22 to 50 parts by mass, with respect to 100 parts by mass of the binder resin.

The filter medium for an air filter according to the present embodiment has water repellency preferably defined as a water column height of 300 mm or more, and more preferably defined as a water column height of 508 mm or more.

In the filter medium for an air filter according to the present embodiment, the tensile strength of the filter medium alone is preferably 0.30 kN/m or more, and more preferably 0.40 kN/m or more.

In the present embodiment, the binder resin, the water repellent, and the isocyanate crosslinking component are provided, as an aqueous dispersion in which all the components are mixed, by impregnation into the wet-laid nonwoven fabric in a wet state, and then the wet-laid nonwoven fabric is heated to achieve drying and crosslinking. As a heating method, then, a multi-cylinder dryer, a Yankee dryer, a hot air dryer, or the like is used in a paper machine, and a rotary dryer, a circulation dryer, or the like is used in a hand paper machine. The heating temperature is 80 to 150° C., more preferably 100 to 140° C. at the initial stage for removing moisture of the impregnation liquid. When the initial heating temperature is higher than 150° C., the crosslinking reaction between moisture and the isocyanate crosslinking component easily proceeds, and sufficient water repellency may not be obtained. The heating temperature, after the moisture in the sheet is sufficiently removed, is 120 to 200° C., preferably 130 to 180° C., and more preferably 150 to 170° C., and has to be a temperature sufficient for the crosslinking reaction triggered by removing the blocking group. The heating time, after the moisture in the sheet is sufficiently removed, is preferably 30 seconds or more, and more preferably 50 seconds or more. Further, after the dry sheet is obtained, further a heat treatment (curing) may be performed in order to ensure the crosslinking reaction. The heating time for the curing is preferably 1 minute or more, and more preferably 3 minutes or more. These heating times are set to be longer within a range where the production efficiency is not reduced.

In the present embodiment, an additive such as an anti-foaming agent can be appropriately added to the aqueous dispersion used for impregnation as long as the effect of the present invention is not impaired.

The wet-laid nonwoven fabric according to the present embodiment preferably contains a glass fiber. Since a glass fiber has high stiffness, in the filter medium, voids required for air to pass therethrough can be sufficiently maintained, and a high PF value can be obtained. As the glass fiber, a glass wool fiber, a chopped glass fiber, or the like can be used.

In the present embodiment, the average fiber diameter of the glass fiber is not particularly limited, but is preferably 0.1 to 10 μm, and more preferably 0.2 to 7 μm. These ranges produce a filter medium having a good balance between the pressure loss and the collection efficiency, that is, a high PF value. Further, two or more types of glass fibers having different average fiber diameters may be incorporated. In order to obtain higher collection efficiency, it is preferable that the glass fibers are at least partially glass fibers each having a fiber diameter of less than 1 μm.

In the present embodiment, fibers other than the glass fiber may be used as fibers contained in the wet-laid nonwoven fabric. Examples of these fibers include natural fibers such as wood pulp; regenerated fibers such as a rayon fiber; and synthetic fibers such as a polyolefin fiber, a polyurethane fiber, and a vinylon fiber. The blending amount of these fibers is preferably set within a range where the effect of increasing the PF value of the glass fiber is not impaired. For example, the blending amount is 30% by mass or less, more preferably 20% by mass or less, and still more preferably 10% by mass or less of the entire fibers.

In a step of producing the filter medium for an air filter according to the present embodiment, a raw material fiber is dispersed in water to obtain a raw material slurry, and the raw material slurry is formed into a sheet by a wet paper-making method to obtain the sheet in a wet state. When the glass fiber is used in a large amount as the raw material fiber, water used for dispersion and papermaking is preferably acidic, and more preferably has a pH of 2 to 4. By performing dispersion and papermaking under acidic conditions, the glass fibers are easily adhered to each other, and strength can be increased.

EXAMPLES

Hereinafter, the present invention will be described with reference to specific examples, but the present invention is not limited to these descriptions. Note that the unit "part(s)" in examples indicates a solid mass ratio of a fiber in a raw material slurry or a solid mass ratio of a component in an impregnation liquid, and the total amount of all fibers is taken as 100 parts in the raw material slurry and the amount of the binder resin is taken as 100 parts in the impregnation liquid. Further, in the examples, "%" indicates the solid mass content of a component in the filter medium.

Example 1

In a table disintegrator, 60 parts of a glass wool having an average fiber diameter of 0.65 μm (B-06-F, manufactured by Unifrax Co.), 30 parts of a glass wool having an average fiber diameter of 2.44 μm (B-26-R, manufactured by Unifrax Co.), and 10 parts of a chopped glass fiber having an average fiber diameter of 6 μm and a cut length of 6 mm (EC-6-6-SP, manufactured by Unifrax Co.) were disintegrated using acidic water having a pH of 3.0 to obtain a raw material slurry. Subsequently, the raw material slurry was subjected to papermaking to obtain a wet-laid nonwoven fabric. Further, an impregnation liquid prepared by mixing 100 parts of an acrylic binder resin (VONCOAT AN-1190S, manufactured by DIC Corporation), 10 parts of a cationic acrylic water repellent free of fluorine and silicon (Unidyne XF-4001, manufactured by Daikin Industries, Ltd.), 1 part of an isocyanate crosslinking agent (Fixer #220, manufactured by Murayama Chemical Laboratory Co., Ltd.), and water was provided by impregnation into the wet-laid nonwoven fabric, which was subsequently dried with a rotary dryer at 130° C. (drying time: 2 minutes) and then further heated with a dryer at 160° C. for 2 minutes to obtain a filter medium for an air filter having a basis weight of 70 g/m². The content of the impregnation component in the filter medium was 5.1%.

Example 2

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a cationic acrylic water repellent free of fluorine and silicon (Unidyne XF-4001, manufactured by Daikin Industries, Ltd.), 1.5 parts of an isocyanate crosslinking agent (Fixer #220, manufactured by Murayama Chemical Laboratory Co., Ltd.), and water was used. The content of the impregnation component in the filter medium was 5.1%.

Example 3

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a cationic acrylic water repellent free of fluorine and silicon (Unidyne XF-4001, manufactured by Daikin Industries, Ltd.), 5 parts of an isocyanate crosslinking agent (Fixer #220, manufactured by Murayama Chemical Laboratory Co., Ltd.), and water was used. The content of the impregnation component in the filter medium was 5.2%.

Example 4

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a cationic acrylic water repellent free of fluorine and silicon (Unidyne XF-4001, manufactured by Daikin Industries, Ltd.), 10 parts of an isocyanate crosslinking agent (Fixer #220, manufactured by Murayama Chemical Laboratory Co., Ltd.), and water was used. The content of the impregnation component in the filter medium was 5.2%.

Example 5

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a cationic acrylic water repellent free of fluorine and silicon (Unidyne XF-4001, manufactured by Daikin Industries, Ltd.), 13 parts of an isocyanate crosslinking agent (Fixer #220, manufactured by Murayama Chemical Laboratory Co., Ltd.), and water was used. The content of the impregnation component in the filter medium was 5.2%.

Example 6

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 35 parts of a cationic acrylic water repellent free of fluorine and silicon (Unidyne XF-4001, manufactured by Daikin Industries, Ltd.), 9 parts of an isocyanate crosslinking agent (Fixer #220, manufactured by Murayama Chemical Laboratory Co., Ltd.), and water was used. The content of the impregnation component in the filter medium was 5.2%.

Example 7

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 50 parts of a cationic acrylic water repellent free of fluorine and silicon (Unidyne XF-4001, manufactured by Daikin Industries, Ltd.), 13 parts of an isocyanate crosslinking agent (Fixer #220, manufactured by Murayama Chemical Laboratory Co., Ltd.), and water was used. The content of the impregnation component in the filter medium was 5.3%.

Example 8

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a cationic acrylic water repellent free of fluorine and silicon (Unidyne XF-4001, manufactured by Daikin Industries, Ltd.), 10 parts of an isocyanate crosslinking agent (Fixer #220, manufactured by Murayama Chemical Laboratory Co., Ltd.), and water was used. Since the conditions for providing the impregnation liquid to the wet paper by impregnation were adjusted, the content of the impregnation component in the filter medium was 2.2%.

Example 9

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a cationic acrylic water repellent free of fluorine and silicon (Unidyne XF-4001, manufactured by Daikin Industries, Ltd.), 10 parts of an isocyanate crosslinking agent (Fixer #220, manufactured by Murayama Chemical Laboratory Co., Ltd.), and water was used. Since the conditions for providing the impregnation liquid to the wet paper by impregnation were adjusted, the content of the impregnation component in the filter medium was 14.7%.

Comparative Example 1

A filter medium for an air filter having a basis weight of 70 g/m² was obtained in the same manner as in Example 1 except that the impregnation step was omitted.

Comparative Example 2

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation) and water was used. The content of the impregnation component in the filter medium was 5.4%.

Comparative Example 3

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a cationic acrylic water repellent free of fluorine and silicon (Unidyne XF-4001, manufactured by Daikin Industries, Ltd.), and water was used. The content of the impregnation component in the filter medium was 5.1%.

Comparative Example 4

A filter medium for an air filter having a basis weight of 70 g/m² was obtained in the same manner as in Example 1 except that an impregnation liquid prepared by mixing 100 parts of an acrylic binder resin (VONCOAT AN-1190S, manufactured by DIC Corporation), 20 parts of a fluorine-based acrylic water repellent (AsahiGuard AG-E300, manufactured by AGC Inc.), and water was used. The content of the impregnation component in the filter medium was 5.4%.

Comparative Example 5

A filter medium for an air filter having a basis weight of 70 g/m² was obtained in the same manner as in Example 1 except that an impregnation liquid prepared by mixing 100 parts of a cationic acrylic water repellent free of fluorine and silicon (Unidyne XF-4001, manufactured by Daikin Industries, Ltd.) and water was used. The content of the impregnation component in the filter medium was 2.5%.

Comparative Example 6

A filter medium for an air filter having a basis weight of 70 g/m² was obtained in the same manner as in Example 1 except that an impregnation liquid prepared by mixing 100 parts of a cationic acrylic water repellent free of fluorine and silicon (Unidyne XF-4001, manufactured by Daikin Industries, Ltd.), 25 parts of an isocyanate crosslinking agent (Fixer #220, manufactured by Murayama Chemical Laboratory Co., Ltd.), and water was used. The content of the impregnation component in the filter medium was 2.6%.

Comparative Example 7

A filter medium for an air filter having a basis weight of 70 g/m² was obtained in the same manner as in Example 1 except that an impregnation liquid prepared by mixing 100 parts of a cationic acrylic water repellent free of fluorine and silicon (Unidyne XF-4001, manufactured by Daikin Industries, Ltd.), 50 parts of an isocyanate crosslinking agent (Fixer #220, manufactured by Murayama Chemical Laboratory Co., Ltd.), and water was used. The content of the impregnation component in the filter medium was 2.8%.

Evaluation of the filter media for an air filter obtained in examples and comparative examples was performed using the following methods.

Pressure Loss

The pressure loss was measured as a differential pressure in ventilating the filter medium for an air filter having an effective area of 100 cm² at a surface wind speed of 5.3 cm/see using a manometer (Manostar Gauge WO81, manufactured by Yamamoto Electric Works Co., Ltd.).

Permeability

The number of upstream and downstream polydispersed polyalphaolefin (PAO) particles in ventilating the filter medium for an air filter having an effective area of 100 cm² with air containing PAO particles generated by a Laskin nozzle at a surface wind speed of 5.3 cm/see was measured using a laser particle counter (KC-22B, manufactured by RION Co., Ltd.), and the permeability was determined from the ratio between the number of upstream particles and the number of downstream particles. The target particle size was set to 0.10 to 0.15 μm and 0.30 μm.

PF Value

The PF value was calculated from the values of the pressure loss and the particle permeability using the formula shown in Mathematical Formula 1. The target particle size was set to 0.10 to 0.15 μm and 0.30 μm.

Tensile Strength

The tensile strength was measured using Autograph AGX-S (manufactured by SHIMADZU CORPORATION) under the conditions of a test width of 1 inch, a test length of 100 mm, and a tensile speed of 15 mm/min.

Water Repellency

The water repellency was measured in accordance with MIL-STD-282.

The results of evaluation of the filter medium for an air filter performed by the above-mentioned methods are shown in Table 1 to Table 4.

TABLE 1

|  |  | Example 1 | Example 2 | Example 3 | Example 4 | Example 5 |
|---|---|---|---|---|---|---|
| Binder resin |  | Acrylic | Acrylic | Acrylic | Acrylic | Acrylic |
| Water repellent |  | Acrylic | Acrylic | Acrylic | Acrylic | Acrylic |
| Crosslinking component |  | Isocyanate | Isocyanate | Isocyanate | Isocyanate | Isocyanate |
| Content of impregnation component in filter medium | [%] | 5.1 | 5.1 | 5.2 | 5.2 | 5.2 |
| Binder resin/Water repellent/Crosslinking component | [Part(s)] | 100/10/1 | 100/20/1.5 | 100/20/5 | 100/20/10 | 100/20/13 |
| Pressure loss | [Pa] | 265 | 264 | 265 | 267 | 271 |
| Permeability regarding 0.10 to 0.15 μm | [%] | 0.1256 | 0.1316 | 0.1247 | 0.1100 | 0.1067 |
| PF value regarding 0.10 to 0.15 μm | [—] | 10.74 | 10.70 | 10.75 | 10.87 | 10.76 |
| Permeability regarding 0.30 μm | [%] | 0.0081 | 0.0092 | 0.0083 | 0.0066 | 0.0064 |
| PF value regarding 0.30 μm | [—] | 15.15 | 15.00 | 15.11 | 15.36 | 15.18 |
| Water repellency | [mm water column height] | 350 | 420 | 550 | 690 | 700 |
| Tensile strength | [kN/m] | 0.86 | 0.79 | 0.75 | 0.76 | 0.73 |

TABLE 2

|  |  | Example 6 | Example 7 | Example 8 | Example 9 |
|---|---|---|---|---|---|
| Binder resin |  | Acrylic | Acrylic | Acrylic | Acrylic |
| Water repellent |  | Acrylic | Acrylic | Acrylic | Acrylic |
| Crosslinking component |  | Isocyanate | Isocyanate | Isocyanate | Isocyanate |
| Content of impregnation component in filter medium | [%] | 5.2 | 5.3 | 2.2 | 14.7 |
| Binder resin/Water repellent/Crosslinking component | [Part(s)] | 100/35/9 | 100/50/13 | 100/20/10 | 100/20/10 |
| Pressure loss | [Pa] | 283 | 302 | 257 | 323 |
| Permeability regarding 0.10 to 0.15 μm | [%] | 0.0875 | 0.0607 | 0.1397 | 0.1208 |
| PF value regarding 0.10 to 0.15 μm | [—] | 10.60 | 10.45 | 10.90 | 8.86 |
| Permeability regarding 0.30 μm | [%] | 0.0045 | 0.0024 | 0.0109 | 0.0077 |
| PF value regarding 0.30 μm | [—] | 15.07 | 15.01 | 15.13 | 12.49 |
| Water repellency | [mm water column height] | 730 | 890 | 310 | 840 |
| Tensile strength | [kN/m] | 0.68 | 0.60 | 0.45 | 1.17 |

TABLE 3

|  |  | Comparative Example 1 | Comparative Example 2 | Comparative Example 3 | Comparative Example 4 |
|---|---|---|---|---|---|
| Binder resin |  | — | Acrylic | Acrylic | Acrylic |
| Water repellent |  | — | — | Acrylic | Fluorine-based |
| Crosslinking component |  | — | — | — | — |
| Content of impregnation component in filter medium | [%] | 0 | 5.4 | 5.1 | 5.4 |
| Binder resin/Water repellent/Crosslinking component | [Part(s)] | 0/0/0 | 100/0/0 | 100/20/0 | 100/20/0 |
| Pressure loss | [Pa] | 244 | 267 | 262 | 272 |
| Permeability regarding 0.10 to 0.15 μm | [%] | 0.1912 | 0.1261 | 0.1452 | 0.0944 |
| PF value regarding 0.10 to 0.15 μm | [—] | 10.93 | 10.65 | 10.63 | 10.91 |
| Permeability regarding 0.30 μm | [%] | 0.0210 | 0.0107 | 0.0112 | 0.0073 |
| PF value regarding 0.30 μm | [—] | 14.79 | 14.59 | 14.79 | 14.92 |

TABLE 3-continued

|  |  | Comparative Example 1 | Comparative Example 2 | Comparative Example 3 | Comparative Example 4 |
|---|---|---|---|---|---|
| Water repellency | [mm water column height] | 0 | 0 | 290 | 870 |
| Tensile strength | [kN/m] | 0.13 | 1.21 | 0.85 | 0.74 |

TABLE 4

|  |  | Comparative Example 5 | Comparative Example 6 | Comparative Example 7 |
|---|---|---|---|---|
| Binder resin |  | — | — | — |
| Water repellent |  | Acrylic | Acrylic | Acrylic |
| Crosslinking component |  | — | Isocyanate | Isocyanate |
| Content of impregnation component in filter medium | [%] | 2.5 | 2.6 | 2.8 |
| Binder resin/Water repellent/Crosslinking component | [Part(s)] | 0/100/0 | 0/100/25 | 0/100/50 |
| Pressure loss | [Pa] | 226 | 247 | 243 |
| Permeability regarding 0.10 to 0.15 μm | [%] | 0.1683 | 0.1060 | 0.1165 |
| PF value regarding 0.10 to 0.15 μm | [—] | 12.04 | 11.81 | 11.84 |
| Permeability regarding 0.30 μm | [%] | 0.0160 | 0.0105 | 0.0121 |
| PF value regarding 0.30 μm | [—] | 16.48 | 15.80 | 15.81 |
| Water repellency | [mm water column height] | 1300 | 1300 | 1300 |
| Tensile strength | [kN/m] | 0.14 | 0.15 | 0.15 |

Comparing Examples 1 to 9 with Comparative Examples 2 and 3, it was verified that the water repellency is improved by using the water repellent and the isocyanate crosslinking component in combination, the practical water repellency value (a water column height of 300 mm or more) is exhibited in Examples 1, 2, and 8, and the practically sufficient water repellency value (a water column height of 508 mm or more) is satisfied in Examples 3 to 7 and 9. The effect of this combination use can be particularly ascertained by comparison of comparison between Examples 2 to 5 and Comparative Example 3. That is, it is found that as compared with Comparative Example 3 in which the binder resin and the water repellent are blended, in Examples 2 to 5 in which the isocyanate crosslinking component is further added, the water repellency is improved from a water column height of 290 mm (Comparative Example 3) to a water column height of 420 mm (Example 2), a water column height of 550 mm (Example 3), a water column height of 690 mm (Example 4), and a water column height of 700 mm (Example 5).

Comparing Example 1 with Comparative Example 3, water repellency of Example 1, by virtue of slightly adding the isocyanate crosslinking component, is higher than that of Comparative Example 3, in spite of half the amount of the water repellent in Comparative Example 3.

Comparing Examples 1 to 9 with Comparative Example 4, it was verified that according to the present invention, a filter medium having a good physical property balance among the PF value, the water repellency, and the tensile strength is obtained as in the case of using the fluorine-based water repellent.

Further, Comparing Comparative Example 1 and Comparative Example 5, it is found that a tensile strength is not imparted only with the water repellent. Further, Comparing Comparative Example 5 with Comparative Examples 6 and 7, it is found that crosslinking only the water repellent, by the isocyanate crosslinking component without the binder resin, does not impart a tensile strength unless incorporation of the binder resin. Comparing Comparative Example 6 with Comparative Example 7, it is found that the blending amount of the isocyanate crosslinking component is irrelevant to the tensile strength in the case of a composition in which the water repellent and the isocyanate crosslinking component are contained but the binder resin is not contained.

From the above, it is found that in Examples 1 to 9, the binder resin imparts a sufficient tensile strength, the binder resin and the water repellent are crosslinked by the isocyanate crosslinking component, and then, the water repellent imparts water repellency.

The invention claimed is:

1. A filter medium for an air filter composed of a wet-laid nonwoven fabric, wherein
   the filter medium for an air filter contains a binder resin and a water repellent,
   the water repellent contains, as a main component, a hydrocarbon-based polymer free of fluorine and silicon in a molecule thereof, and
   the binder resin and the water repellent are crosslinked by an isocyanate crosslinking component.

2. The filter medium for an air filter according to claim 1, wherein the hydrocarbon-based polymer is an acrylic polymer.

3. The filter medium for an air filter according to claim 1, wherein the wet-laid nonwoven fabric contains a glass fiber.

4. The filter medium for an air filter according to claim 1, wherein the binder resin is an acrylic binder resin.

5. The filter medium for an air filter according to claim 1, wherein the water repellent is a cationic water repellent.

6. The filter medium for an air filter according to claim 1, wherein a solid mass ratio between the binder resin and the water repellent is 10 to 50 parts by mass of the water repellent with respect to 100 parts by mass of the binder resin.

7. The filter medium for an air filter according to claim 1, wherein a solid mass ratio of the water repellent to the isocyanate crosslinking component (water repellent/cross-linking agent) is 95/5 to 60/40.

8. The filter medium for an air filter according to claim 1, wherein a total solid mass content of the binder resin, the water repellent, and the isocyanate crosslinking component in the filter medium is 2 to 15% by mass with respect to the entire filter medium.

9. The filter medium for an air filter according to claim 1, wherein a mass ratio between the binder resin and a sum of the water repellent and the isocyanate crosslinking component is 11 to 70 parts by mass of the sum of the water repellent and the isocyanate crosslinking component with respect to 100 parts by mass of the binder resin.

10. A method for producing a filter medium for an air filter, the method comprising the steps of:

forming a sheet in a wet state by forming a fiber slurry into the sheet by a wet papermaking method;

impregnating the sheet in a wet state with an aqueous dispersion containing a binder resin, a water repellent containing, as a main component, a hydrocarbon-based polymer free of fluorine and silicon in a molecule thereof, and an isocyanate crosslinking component; and obtaining a dry sheet by heating and drying the sheet in a wet state impregnated with the aqueous dispersion, and by crosslinking the binder resin and the water repellent by the isocyanate crosslinking component.

11. The method for producing a filter medium for an air filter according to claim 10, wherein the hydrocarbon-based polymer is an acrylic polymer.

12. The method for producing a filter medium for an air filter according to claim 10, wherein the fiber slurry contains a glass fiber.

* * * * *